United States Patent
Li et al.

(10) Patent No.: US 12,277,024 B2
(45) Date of Patent: Apr. 15, 2025

(54) METHOD FOR MANAGING ECU ON VEHICLE, AND ECU AND READABLE STORAGE MEDIUM

(71) Applicant: ZTE CORPORATION, Shenzhen (CN)

(72) Inventors: Cui Li, Shenzhen (CN); Zhonghui Che, Shenzhen (CN); Xiaoyu Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 135 days.

(21) Appl. No.: 18/246,555

(22) PCT Filed: Nov. 3, 2021

(86) PCT No.: PCT/CN2021/128411
§ 371 (c)(1),
(2) Date: Mar. 24, 2023

(87) PCT Pub. No.: WO2022/095896
PCT Pub. Date: May 12, 2022

(65) Prior Publication Data
US 2023/0367664 A1    Nov. 16, 2023

(30) Foreign Application Priority Data
Nov. 9, 2020 (CN) .................. 202011240019.5

(51) Int. Cl.
*G06F 11/00* (2006.01)
*B60R 16/023* (2006.01)
*G06F 11/07* (2006.01)

(52) U.S. Cl.
CPC ........ *G06F 11/0739* (2013.01); *B60R 16/023* (2013.01); *G06F 11/0751* (2013.01); *G06F 11/0793* (2013.01)

(58) Field of Classification Search
CPC ............ G06F 11/0739; G06F 11/0751; G06F 11/0793
See application file for complete search history.

(56) References Cited

U.S. PATENT DOCUMENTS

| | | | | |
|---|---|---|---|---|
| 6,847,864 | B2 * | 1/2005 | Goto ........................ | B60L 3/12 701/32.7 |
| 2015/0082089 | A1 * | 3/2015 | Jiang ................... | G06F 11/3003 714/25 |

(Continued)

FOREIGN PATENT DOCUMENTS

| CN | 104281071 A | 1/2015 |
|---|---|---|
| CN | 104657304 A | 5/2015 |

(Continued)

OTHER PUBLICATIONS

International Searching Authority. International Search Report and Written Opinion for PCT Application No. PCT/CN2021/128411 and English translation, mailed Jan. 17, 2022, pp. 1-10.

(Continued)

*Primary Examiner* — Amine Riad
(74) *Attorney, Agent, or Firm* — Vivacqua Crane, PLLC (57) ABSTRACT

A method for managing an ECU on a vehicle, and an ECU and a computer-readable storage medium are disclosed. The method may include: monitoring a working state of at least one ECU on a vehicle (S201); and in response to detecting an abnormal ECU in an abnormal working state, sending a control instruction to the abnormal ECU, where the control instruction is configured to trigger the abnormal ECU to execute a corresponding restore action (S202).

15 Claims, 3 Drawing Sheets

(56) References Cited

U.S. PATENT DOCUMENTS

2018/0262466 A1    9/2018   Atad et al.
2019/0250969 A1*   8/2019   Tan .................... G06F 11/0772
2020/0342099 A1   10/2020   Kerstein
2021/0158631 A1*   5/2021   Kwon .................... G07C 5/006

FOREIGN PATENT DOCUMENTS

| JP | H1013494   A  | 1/1998  |
| JP | 2002108638  A  | 4/2002  |
| JP | 2004326629  A  | 11/2004 |
| WO | 2019159615 A1 | 8/2019  |

OTHER PUBLICATIONS

Japan Patent Office. Notice of Reasons for Refusal for JP Application No. 2023-519856 and English translation, mailed Apr. 2, 2024, pp. 1-10.
European Patent Office. Extended European Search Report for EP Application No. 2188593.7, mailed Feb. 2, 2024, pp. 1-7.

* cited by examiner

METHOD FOR MANAGING ECU ON VEHICLE, AND ECU AND READABLE STORAGE MEDIUM

CROSS-REFERENCE TO RELATED APPLICATION

This application is a national stage filing under 35 U.S.C. § 371 of international application number PCT/CN2021/128411 filed on Nov. 3, 2021, which claims priority to Chinese patent application No. 202011240019.5 filed on Nov. 9, 2020. The contents of these applications are incorporated herein by reference in their entirety.

TECHNICAL FIELD

Embodiments of the present disclosure relate to but are not limited to the technical field of vehicles, and, in particular, relate to but are not limited to a method for managing an electronic control unit (ECU) on a vehicle, an ECU and a computer-readable storage medium.

BACKGROUND

With the development of intelligence and informationization, automotive electrical systems have become increasingly complex, and current vehicles generally have dozens of ECUs. The increase of ECUs represents the complexity of functions and the challenge for stability. An ECU node is composed of hardware and software. For vehicle ECU products, these ECUs are like black boxes, and users may not even know the existence of the ECUs. If an ECU is abnormal, the user has to drive the vehicle to a 4S shop for inspection and maintenance, which is very troublesome and unpleasant for the user.

At present, there is a lack of solution for a vehicle to correct the working state of a faulty ECU node through other ECUs. Instead, in existing vehicles, each ECU deals with its own fail-safe mechanism, so there is a certain risk for the stability of the functions of the whole vehicle which depend on the operating state of each ECU, and the risk is relatively high.

For a vehicle in a key-off state, if some ECU works abnormally and fails to go into a sleep mode according to an agreed power management mode, undesirable drainage of a battery of the vehicle may be caused, which is unacceptable to the user.

SUMMARY

Embodiments of the present disclosure provide a method for managing an ECU on a vehicle, an ECU and a computer-readable storage medium.

To at least partially solve the above technical problems, an embodiment of the present disclosure provides a method for managing an ECU on a vehicle, which may include: monitoring a working state of at least one ECU on a vehicle; and in response to detecting an abnormal ECU in an abnormal working state, sending a control instruction to the abnormal ECU, where the control instruction is configured to trigger the abnormal ECU to execute a corresponding restore action.

An embodiment of the present disclosure provides an ECU, which may include a processor, a memory and a communication bus, where the communication bus is configured to implement connection communication between the processor and the memory, and the processor is configured to execute one or more computer programs stored in the memory to perform the method for managing an ECU on a vehicle described above.

An embodiment of the present disclosure provides a computer-readable storage medium storing one or more computer programs, where the one or more computer programs are executable by the one or more processors to perform the method for managing an ECU on a vehicle described above.

Other features and corresponding beneficial effects of the present disclosure are explained in the subsequent description, and it should be understood that at least some of the beneficial effects become apparent from the description of the present disclosure.

DETAILED DESCRIPTION

In order to make the objective, technical schemes and advantages of the present disclosure more clearly understood, the embodiments of the present disclosure will be further illustrated in detail by means of particular embodiments in conjunction with the accompanying drawings. It should be understood that the particular embodiments described herein are only intended to explain the present disclosure, and are not intended to limit the present disclosure.

Example Embodiment I

Figure 1:
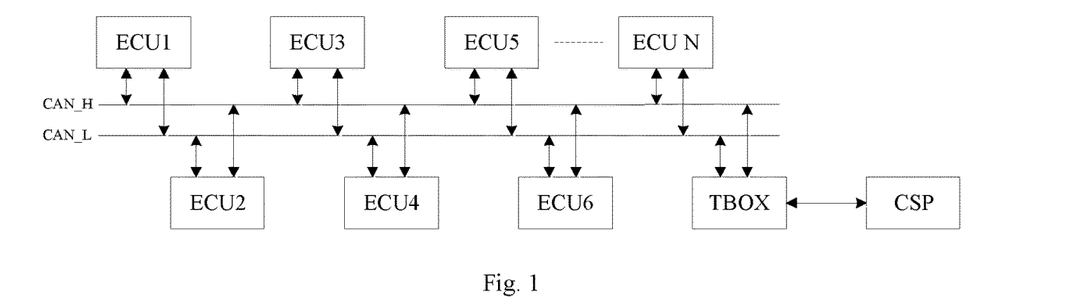
FIG. 1 is a schematic diagram of connections of ECUs on a vehicle according to example embodiment I of the present disclosure.

To improve the stability and reliability of ECUs operating on a vehicle, the first embodiment of the present disclosure provides a method for managing an ECU on a vehicle. FIG. 1 is a schematic diagram of connections of ECUs on a vehicle. Each ECU is connected through a controller area network (CAN) bus to send and receive network messages, APP messages and diagnosis messages to and from each other, and the vehicle interacts with a CSP server through a Telematics Box (TBOX).

The whole function of the ECUs is accomplished by each ECU in cooperation. In the present disclosure, a specific ECU node(s) is/are utilized as an audit node(s) to supervise the working state of other ECUs, and a common node(s) is/are the supervised objects.

In-vehicle TBOX: also belonging to the ECU node, includes a communication system that interacts with an external network through a wireless 3GPP network, and also supports information interaction with other ECUs in the vehicle through the CAN, and can also be utilized for interacting with the CSP server to synchronize the traffic parameters and the working state of each ECU to control the ECUs of the vehicle.

In-vehicle cloud server CSP: which is equivalent to an application system of Internet of Vehicles, is a vehicle operation information platform of a cloud architecture. The CSP is maintained by the automaker. The in-vehicle CSP provides application services to the vehicle owner and tracks the state of the vehicle in the use process. In the present disclosure, the automaker maintains and controls traffic parameters of the ECUs of the vehicle through the CSP.

Controller Area Network (CAN): is the most widely utilized field bus for vehicles at present, and each ECU performs the information interaction through the CAN. In the present disclosure, the audit node collects information of other nodes from the CAN to determine the state of the nodes and conduct control in response to detecting an abnormal node.

Figure 2:
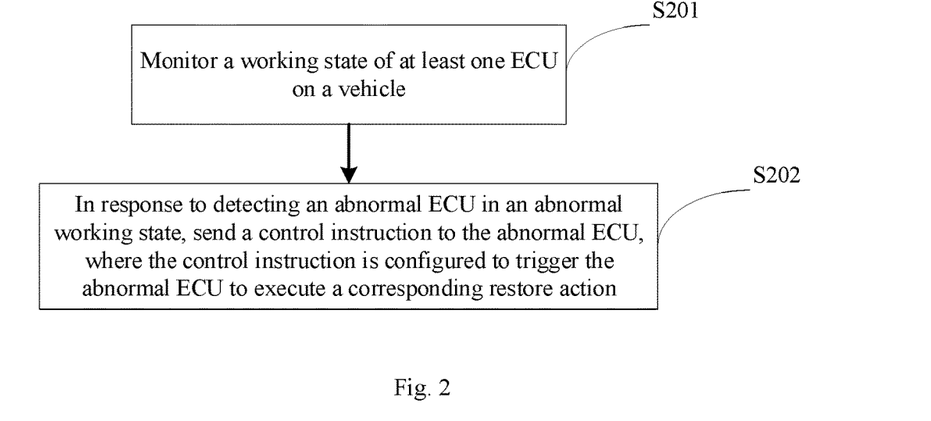
FIG. 2 is a flowchart of example embodiment I of the present disclosure.

This embodiment provides a method for managing an ECU on a vehicle, with reference to FIG. 2, including the following steps.

At S201, a working state of at least one ECU on a vehicle is monitored.

At S202, in response to detecting an abnormal ECU in an abnormal working state, a control instruction is sent to the abnormal ECU, where the control instruction is configured to trigger the abnormal ECU to execute a corresponding restore action.

In an implementation, monitoring the working state of at least one ECU on the vehicle can be performed by monitoring the working state of the ECU through an audit node configured on the vehicle. The audit node may be an In-vehicle TBOX and a target ECU; or, may also be only one of an in-vehicle TBOX or a target ECU; or a combination of a TBOX and target ECUs, such as the TBOX and multiple target ECUs. For a target ECU in this embodiment, an ECU which has a relatively stable working condition or low functional complexity may be selected as the audit node, according to the actual work performance or the function complexity of the ECU. Then, the audit node ECU monitors the working state of at least one ECU on the vehicle.

The monitoring means may be allocating a corresponding physical address for each ECU, and thus monitoring the working state of the ECU according to the corresponding physical address. A control instruction can be sent to an abnormal ECU according to the corresponding physical address. According to this embodiment, in response to detecting an abnormal ECU in an abnormal working state, a control instruction is sent to the abnormal ECU. In some implementations, the abnormal ECU may execute the corresponding restore action according to the control instruction, thereby improving the operation stability of the ECUs on the vehicle and preventing the vehicle battery drainage caused by the abnormality of the ECU, improving the user experience.

The control instruction may include at least one of: an ECU restart instruction for triggering the abnormal ECU to execute a restart; an ECU shutdown instruction for triggering the abnormal ECU to execute a shutdown; or an ECU firmware update instruction for triggering the abnormal ECU to execute a firmware update.

In an implementation of the present disclosure, in response to detecting an abnormal ECU in an abnormal working state, a control instruction is sent to the abnormal ECU.

The control instruction may be an ECU restart instruction, and the abnormal ECU can execute a restart in response to receiving the ECU restart instruction.

The control instruction may also be an ECU shutdown instruction, and the abnormal ECU can execute a shutdown in response to receiving the ECU shutdown instruction.

The control instruction may also be an ECU firmware update instruction, and the abnormal ECU can execute a firmware update in response to receiving the ECU firmware update instruction.

In an implementation, in the operation where the control instruction is sent to the abnormal ECU, an instruction code corresponding to an control action may be directly sent to the ECU, such as sending a UDS restart instruction 0x11 of which an ID is the physical address of the corresponding ECU, and then waiting for the reply of the 0x11; or sending a customized UDS control instruction to the abnormal ECU such that the abnormal ECU knows its abnormal state through the customized UDS control instruction, and thus cooperates with the corresponding control instruction to execute the restart action or the shutdown action or the firmware update action. The ECU firmware update instruction described in this example may be only an instruction configured to trigger the abnormal ECU to perform the firmware update, i.e., the ECU firmware update instruction may not contain the corresponding firmware. After receiving the ECU firmware update instruction, the abnormal ECU may acquire firmware information required for the update from a local storage, a server or an external storage device. Here, the firmware update in this embodiment may be a firmware update to the latest version or a parallel update, i.e. keeping the version number of the firmware unchanged, or an update to an old firmware version, such as an old firmware version having relatively stable performance corresponding to the ECU stored in the local storage, the server or the local external storage device; therefore, it is also feasible to instruct the abnormal ECU to perform the firmware update through the ECU firmware update instruction. After the control instruction is sent to the abnormal ECU, the CAN bus can broadcast the message that the abnormal ECU executes the restore action to the TBOX, and then the TBOX reports the message to the CSP server.

The operation in which the abnormal ECU having an abnormal working state is detected may include:
  receiving a network management message from an ECU, where the network management message contains a traffic state parameter corresponding to the ECU;
  determining that the ECU is in an abnormal state by comparing the traffic state parameter with a normal traffic state parameter corresponding to the ECU.

For example, after being powered on, the TBOX collects the notification message carrying the traffic parameter of each ECU from the CSP server, parses and saves the message and broadcasts the parsed message to other audit nodes of the CAN bus through the CAN. Therefore, all audit nodes know the traffic parameter of each ECU in the normal operation state. In this embodiment, the format of the traffic parameter recorded by the CSP server and of each ECU can be set according to the fact that the network management message ID of each ECU of the vehicle is unique, for example, the network management message ID of the ECU is utilized as a label of this record, and the network management message ID represents one specific ECU node. The vehicle includes two critical states: a KL15 off (key-off) state and a KL15 on (key-on) state, and the traffic parameters of the corresponding ECUs in the two critical states can be recorded. Therefore, in this embodiment, the network management message sent from the ECU may be parsed to obtain the traffic state parameter of the current ECU, thereby determining whether the state of the ECU is abnormal or not by comparing the traffic state parameter with the normal traffic state parameter corresponding to the ECU.

Before receiving the network management message uploaded by the ECU, the method also includes: in response to abnormal receiving of the network management message from the ECU, the ECU is determined to be in an abnormal working state.

In another implementation, if the ECU is in the state where it is unable to send the network management message, the ECU can be determined to be in an abnormal state directly according to the fact that the network management message sent by the ECU cannot be received properly. For example, in the key-on state, the normal network management message sent from the server is sent at regular intervals, with the time interval being t1, and after time t1, if the audit node fails to receive the network management message from the ECU, the ECU may be directly determined to be in an abnormal state.

The determining that the ECU is in an abnormal state by comparing the traffic state parameter with a normal traffic state parameter corresponding to the ECU includes at least one of:

determining that the ECU is in an abnormal state in response to the traffic state parameter being inconsistent with the normal traffic state parameter;

determining that the ECU is in an abnormal state in response to ready sleep state (RSS) information extracted from the network management message indicating that a normal duration of RSS being exceeded.

For example, in the KL15 on (key-on) state, the traffic state parameter in the key-on state is compared against the traffic state parameter during normal driving, and if there is any inconsistency, the ECU is directly determined to be in an abnormal state. Here, the traffic state parameter during normal driving can be obtained from the server at power-on, or by reading the local storage.

In the KL15 off (key-off) state, the RSS information corresponding to the ECU may be extracted from the network management message and compared against the normal duration of RSS. If the normal duration of RSS is exceeded, it is determined that the ECU is in an abnormal state. In the key-off state, in a normal duration of RSS, once the traffic transmission is completed, the ECU exits the RSS and won't stay at the RSS. If the ECU stays at the RSS, it means that there is an abnormality in the ECU, and the abnormal ECU is the ECU that has been sending network management messages abnormally. The maximum traffic maintenance time of each corresponding ECU can be obtained from the server.

When the vehicle is in a key-off state, the operation in which the control instruction is sent to the abnormal ECU includes at least one of:

directly sending an ECU restart instruction to the abnormal ECU;

determining a fault code of the abnormal ECU, and in response to determining according to the fault code that the abnormal ECU is restorable by a restart, sending an ECU restart instruction to the abnormal ECU;

directly sending an ECU shutdown instruction to the abnormal ECU;

determining a fault code of the abnormal ECU, and in response to determining according to the fault code that the abnormal ECU is unrestorable by a restart, sending an ECU shutdown instruction to the abnormal ECU or sending an ECU firmware update instruction to the abnormal ECU;

directly sending an ECU firmware update instruction to the abnormal ECU;

sending an ECU restart instruction to the abnormal ECU according to a preset restart control rule, and in response to detecting that the abnormal ECU is still abnormal after a restart according to the ECU restart instruction, sending an ECU shutdown instruction or an ECU firmware update instruction to the abnormal ECU;

sending an ECU restart instruction to the abnormal ECU according to a preset restart control rule, sending an ECU firmware update instruction to the abnormal ECU in response to detecting that the abnormal ECU is still abnormal after a restart according to the ECU restart instruction, and sending an ECU shutdown instruction to the abnormal ECU in response to detecting that the abnormal ECU is still abnormal after a firmware update according to the ECU firmware update instruction.

In an implementation, after it is determined that the ECU is in an abnormal state in the above operation(s), a control instruction is further sent to the abnormal ECU through the audit node. The control instruction may be the ECU restart instruction directly sent to the abnormal ECU, and the abnormal ECU restarts after receiving the instruction.

Alternatively, a fault code of the abnormal ECU is determined, and in response to determining according to the fault code that the abnormal ECU is restorable by a restart, the ECU restart instruction is sent to the abnormal ECU. The operation of determining according to the fault code that the abnormal ECU is restorable by a restart may be performed as follows. For example, after determining the fault code of the abnormal ECU, the fault code is compared against a preset code comparison table or code database. After the comparison, if it is determined that the abnormal ECU is restorable by a restart, the ECU restart instruction is sent to the abnormal ECU. If no corresponding fault code is recorded in the code record table, it is feasible to try to send the ECU restart instruction to the abnormal ECU. If the restart restoration succeeds, the corresponding record table or database may be updated to record the corresponding code as restorable by a restart. If the restart restoration fails, the corresponding record table or database may be updated to record the corresponding code as unrestorable by a restart.

Alternatively, an ECU shutdown instruction is directly sent to the abnormal ECU. After the abnormal ECU in an abnormal working state is detected, to overcome the problem that as long as one ECU node is sending the network management message, all ECU nodes will not enter a CAN bus sleep, i.e. a low power consumption state, that is to say, once one node is abnormal, the whole vehicle is abnormal and cannot go into a sleep mode, causing battery drainage, in this embodiment, when the vehicle is in a key-off state, a shutdown instruction is directly sent to the corresponding abnormal ECU, thereby solving the problem that once one node is abnormal, the whole vehicle is abnormal and cannot go into a sleep mode, which causes the battery drainage.

Alternatively, a fault code of the abnormal ECU is determined, and in response to determining according to the fault code that the abnormal ECU is unrestorable by a restart, the ECU shutdown instruction is sent to the abnormal ECU or the ECU firmware update instruction is sent to the abnormal ECU. Refer to the above for the specific fault code determination operations. In this embodiment, when the vehicle is in the key-off state, the shutdown instruction or the firmware update instruction is directly sent to the corresponding abnormal ECU, thereby solving the problem that once one node is abnormal, the vehicle is abnormal and cannot go into a sleep mode, which causes the battery drainage.

Alternatively, the ECU firmware update instruction is directly sent to the abnormal ECU. Similar to the technical scheme of the restart instruction, in this embodiment, the abnormal ECU is restored directly through the firmware update.

Alternatively, the ECU restart instruction is sent to the abnormal ECU according to the preset restart control rule, and the ECU shutdown instruction or the ECU firmware update instruction is sent to the abnormal ECU in response to detecting that the abnormal ECU is still abnormal after restart according to the ECU restart instruction. The preset restart control rule in this embodiment may refer to restart times, such as repeatedly executing the restart instruction three times, repeatedly executing the restart instruction three times at specified time intervals. After similar restart control rules are executed, if the ECU is still in an abnormal state, the ECU shutdown instruction or the ECU firmware update instruction may be sent to the abnormal ECU. Since the restart control cannot restore the abnormal ECU, it is feasible to perform a firmware update on the ECU or directly shut down the ECU.

Alternatively, an ECU restart instruction is sent to the abnormal ECU according to the preset restart control rule, an ECU firmware update instruction is further sent to the abnormal ECU in response to detecting that the abnormal ECU is still abnormal after a restart according to the ECU restart instruction, and an ECU shutdown instruction is further sent to the abnormal ECU in response to detecting that the abnormal ECU is still abnormal after a firmware update according to the ECU firmware update instruction. Different from the above process, in this implementation, in an extreme case where the restart control rule cannot restore the abnormal ECU and the firmware update cannot restore the faulty ECU either, the ECU can be shut down after both the restart and the update are executed, thereby preventing battery drainage caused by the ECU failure.

When the vehicle is in a key-on state, the operation in which the control instruction is sent to the abnormal ECU includes at least one of:

directly sending an ECU restart instruction to the abnormal ECU;

determining a fault code of the abnormal ECU, and in response to determining according to the fault code that the abnormal ECU is restorable by a restart, sending an ECU restart instruction to the abnormal ECU;

determining a fault code of the abnormal ECU, and in response to determining according to the fault code that the abnormal ECU is unrestorable by a restart, sending an ECU firmware update instruction to the abnormal ECU;

directly sending an ECU firmware update instruction to the abnormal ECU;

sending an ECU restart instruction to the abnormal ECU according to a preset restart control rule, and sending an ECU firmware update instruction to the abnormal ECU in response to detecting that the abnormal ECU is still abnormal after a restart according to the ECU restart instruction.

When the vehicle is in a key-on state, the operation in which the control instruction is sent to the abnormal ECU includes directly sending the ECU restart instruction to the abnormal ECU. Since some ECUs cannot be directly restarted during driving of the vehicle, before the control instruction is sent to the abnormal ECU, it may be further determined whether the abnormal ECU is provided with a corresponding configuration item, and the control instruction is sent to the abnormal ECU in response to determining that the abnormal ECU is provided with the corresponding configuration item. For example, after being powered on, the TBOX receives the notification message carrying the traffic parameter of each ECU from the server and parses the notification message to obtain whether each ECU is provided with a restart switch. In the case where each ECU is provided with the restart switch, it means that the ECU in the key-on state can restart or execute an update action. In this embodiment, in the case where it is determined that the abnormal ECU is provided with the corresponding configuration item, the ECU restart instruction or the ECU update instruction is directly sent to the abnormal ECU, thereby controlling the ECU to restore the state in the key-on state.

Alternatively, a fault code of the abnormal ECU is determined, and in response to determining according to the fault code that the abnormal ECU is restorable by a restart, the ECU restart instruction is sent to the abnormal ECU. Refer to the above for the specific fault code comparison operations. In this embodiment, corresponding to the key-on state, in response to determining according to the fault code that the abnormal ECU is restorable by a restart, the ECU restart instruction is sent to the abnormal ECU, thereby restoring the ECU from failure during driving of the vehicle.

Alternatively, a fault code of the abnormal ECU is determined, and in response to determining according to the fault code that the abnormal ECU is unrestorable by a restart, an ECU shutdown instruction or an ECU firmware update instruction is sent to the abnormal ECU. That is, corresponding to the key-on state, in response to determining according to the fault code that the abnormal ECU is unrestorable by a restart, the ECU firmware update instruction may be sent to the abnormal ECU. If, after the firmware is updated, the ECU is still abnormal, an alarm can be provided to the user to notify the user that a certain ECU of the vehicle is currently in an abnormal state. If, after the firmware is updated, the ECU is still abnormal, the abnormal situation of the corresponding ECU can be sent to the server side, and the professionals on the server side can manually determine the corresponding solution, such as rewriting the code, and solve the abnormal state of the ECU from the server side.

Similarly, the ECU firmware update instruction can also be directly sent to the abnormal ECU. Alternatively, the ECU restart instruction is sent to the abnormal ECU according to the preset restart control rule, and the ECU firmware update instruction is sent to the abnormal ECU in response to detecting that the abnormal ECU is still abnormal after a restart according to the ECU restart instruction. The execution method is the same as that in the key-off state and will not be repeated herein.

In a case where multiple target ECUs are provided, and the multiple target ECUs are in an abnormal state, sending the ECU restart instruction to the abnormal ECU includes:

sending the ECU restart instruction to the multiple target ECUs at different time points such that the multiple target ECUs restart at different time points.

In a case where multiple target ECUs are provided and a proportion of the multiple target ECUs are in an abnormal state, in response to the proportion exceeding a preset proportion threshold, the ECU restart instruction may be sent to the abnormal target ECUs according to a restart sequence.

In this embodiment, in the case where the vehicle is equipped with multiple audit nodes, each audit node monitors the working state of all ECUs except the audit node.

Although the ECUs, which are relatively simple in function, are selected as the audit nodes, these ECUs may also fail. In an extreme case, the audit node ECUs may fail at the same time for a period of time. For this case, in this embodiment, the ECU restart instruction can be sent to the multiple target ECUs at different time points such that the multiple target ECUs restart at different time points. That is, the restart instruction is sent to the audit point ECUs at different time nodes, so as to ensure all audit nodes do not restart at the same time when multiple audit nodes fail. Of course, it is also feasible to set different restart delays for the audit nodes, i.e., the restart instruction is sent at the same time but the audit nodes can restart according to the preset different restart delays, so as to ensure that at least one audit node in the ECU network is in a working state.

It is also feasible to monitor whether the proportion of the target ECUs in the abnormal state exceeds the preset proportion threshold. For example, 4 audit nodes are equipped in the vehicle, and if two of the four audit nodes are abnormal, the ECUs of the two audit nodes can directly restart. If all the other three audit nodes except the current audit node are abnormal, a restart sequence can be determined according to different restart priorities, and then the three audit nodes restart in sequence. The ECUs restart at intervals. For example, if the restart completion time of an ECU is 2 minutes, the restart interval time for the restarts in sequence may be set as 2 minutes.

To sum up, according to this embodiment, multiple nodes having the relatively stable working conditions as the audit nodes may be selected from among the ECU nodes of the vehicle. The CAN bus is detected to monitor the working state of other ECU nodes. The TBOX receives the notification message sent from the CSP, sets the maximum traffic duration of each ECU and the traffic working logic of the ECU, and broadcasts the message to other audit nodes. When the audit node detects that some ECU is working abnormally, and learns that the abnormality time exceeds the maximum traffic duration of the an ECU, it is considered that this node is abnormal, then the audit node determines the state of the vehicle, if it is considered as a serious fault and restart conditions are satisfied, the audit node sends CAN restart diagnostic instructions to the ECU so that the ECU restarts to restore to the initial state and then restore to a normal state; otherwise, the audit node sends the abnormality to the server, manual determination and operation are performed on the server side to perform a preliminary problem analysis. If the problem can be solved by a restart, the ECU can be restarted from the server side, and there is no need to go to a 4S store. This ensures that the abnormal node will not be in an abnormal working state for a long time. When the vehicle is in the key-off state, the operations in this embodiment can also prevent the battery drainage caused by the ECU abnormality, and improve the vehicle use experience of users.

Example Embodiment II

Figure 3:
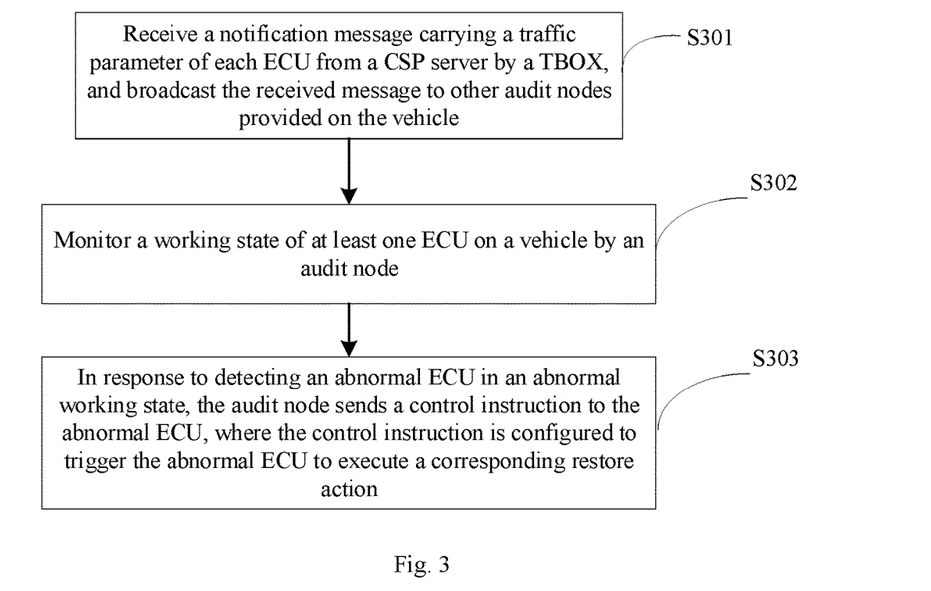
FIG. 3 is a flowchart of example embodiment II of the present disclosure.

This embodiment provides a method for managing an ECU on a vehicle, as shown in FIG. 3, including the following steps.

At S301, a notification message carrying a traffic parameter of each ECU from a CSP server is received by a TBOX and is broadcast to other audit nodes provided on the vehicle.

At S302, a working state of at least one ECU on a vehicle is monitored by an audit node.

At S303, in response to detecting an abnormal ECU in an abnormal working state, an audit node sends a control instruction to the abnormal ECU, where the control instruction is configured to trigger the abnormal ECU to execute a corresponding restore action.

The audit node may be an in-vehicle TBOX and a target ECU; or may also be only one of an in-vehicle TBOX or a target ECU; or a combination of a TBOX and target ECUs, such as the TBOX and multiple target ECUs in this embodiment. For the target ECUs, in this embodiment, an ECU having relatively stable working condition or low functional complexity may be selected as the audit node, according to the actual work performance or the function complexity of the ECU. Then the audit node ECU monitors the working state of at least one ECU on the vehicle.

After being powered on, the TBOX collects the notification message carrying the traffic parameter of each ECU from the CSP server, parses and saves the message and broadcasts the parsed message to other audit nodes of the CAN bus through the CAN. Therefore, all audit nodes know the traffic parameter of each ECU in the normal operation state. In this embodiment, the format of the traffic parameter recorded by the CSP server and of each ECU can be set according to the fact that the network management message ID of each ECU of the vehicle is unique, for example, the network management message ID of the ECU is utilized as a label of this record, and the network management message ID represents one specific ECU node. The network management message sent by the ECU to the audit node may include two critical states: a KL15 off (key-off) state and a KL15 on (key-on) state. The audit node can record the two critical states. The network management message may also include the traffic parameters of the corresponding ECU. Therefore, in this embodiment, the network management message sent from the ECU may further be parsed to obtain the traffic state parameter of the current ECU, thereby determining whether the state of the ECU is abnormal or not by comparing the traffic state parameter with the normal traffic state parameter corresponding to the ECU.

The monitoring means may be allocating a corresponding physical address for each ECU, and thus monitoring the working state of the ECU according to the corresponding physical address. A control instruction can be sent to an abnormal ECU according to the corresponding physical address. According to this embodiment, in response to detecting an abnormal ECU in an abnormal working state, a control instruction is sent to the abnormal ECU. In some implementation, the abnormal ECU may execute the corresponding restore action according to the control instruction, thereby improving the operation stability of the ECUs on the vehicle and preventing the vehicle battery drainage caused by the abnormality of the ECU, improving the user experience.

The control instruction may include at least one of: an ECU restart instruction for triggering the abnormal ECU to execute a restart; an ECU shutdown instruction for triggering the abnormal ECU to execute a shutdown; or an ECU firmware update instruction for triggering the abnormal ECU to execute a firmware update.

Figure 4:
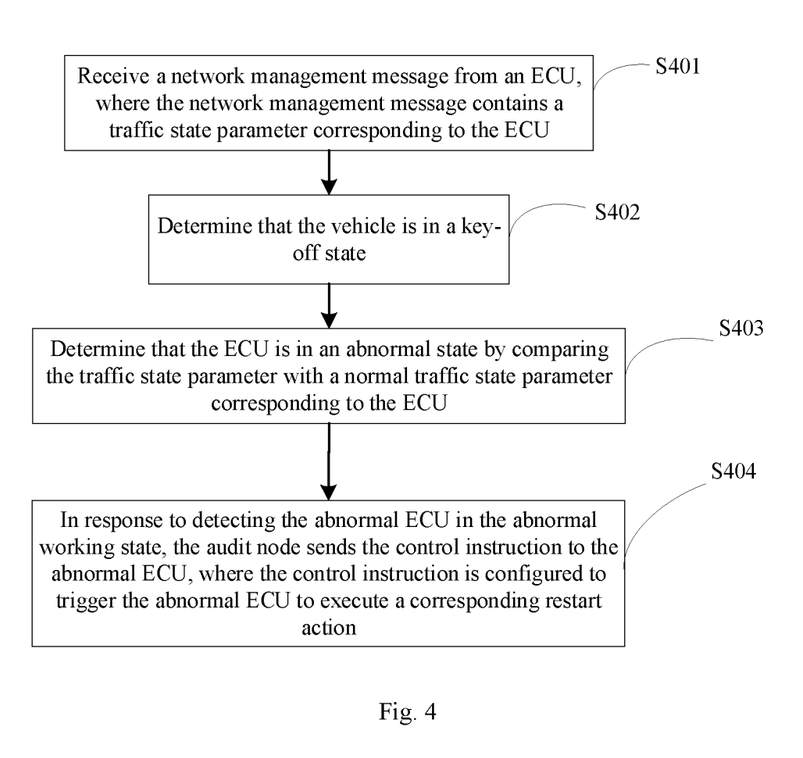
FIG. 4 is a flowchart in a key-off state of example embodiment II of the present disclosure.

In this embodiment, the case where the ECU is controlled to restart in the key-off state is used as an example. As shown in FIG. 4, the method of this embodiment includes the following steps.

At S401, a network management message from an ECU is received, where the network management message contains a traffic state parameter corresponding to the ECU.

At S402, it is determined that the vehicle is in a key-off state.

At S403, it is determined that the ECU is in an abnormal state by comparing the traffic state parameter with a normal traffic state parameter corresponding to the ECU.

At S404, in response to detecting the abnormal ECU in the abnormal working state, an audit node sends the control instruction to the abnormal ECU, where the control instruction is configured to trigger the abnormal ECU to execute the corresponding restart action.

In an implementation, in the method of the present disclosure, the audit node performs the next determination according to the ID of the received network management message of the ECU, this ID represents a specific ECU, i.e., means that the ECU is not in an RSS state, and this ECU may be the cause of the network maintaining abnormal.

The state of KL15 is determined. If KL15 is in a state that requires the CAN to work normally, the audit node does not need to continue this abnormality monitoring process, i.e., in this case, it can be considered that the ECU is in a normal working state and no action will be taken. If KL15 is in a state that does not require the CAN network to work normally, the audit node proceeds to the next step.

It is determined whether the ECU corresponding to the network management message is in the RSS, and if the ECU is not in the RSS, the abnormality monitoring process does not need to be started, and it is indicated that the ECU judges it is necessary to maintain the CAN. If the audit ECU abnormally maintains the CAN, this abnormality can be monitored at other audit ECU nodes and a starting abnormality protection process is entered. This abnormality determination basis can be obtained according to network management protocols of AutoSar.

In this embodiment, in the key-off state, the operation in which it is determined that the ECU is in an abnormal state by comparing the traffic state parameter with a normal traffic state parameter corresponding to the ECU includes: determining that the ECU is in an abnormal state in response to ready sleep state (RSS) information extracted from the network management message indicating that a normal duration of RSS being exceeded.

In the KL15 off (key-off) state, the RSS information corresponding to the ECU may be extracted from the network management message, and compared against the normal duration of RSS. If the normal duration of RSS is exceeded, it is determined that the ECU is in an abnormal state. In the key-off state, in a normal duration of RSS, once the traffic transmission is completed, the ECU exits the RSS and won't stay at the RSS. If the ECU stays at the RSS, it means that there is an abnormality in the ECU, and the abnormal ECU is the ECU that has been sending network management messages abnormally. The maximum traffic maintenance time of each corresponding ECU can be obtained from the server.

In an implementation, the duration of RSS may be calculated according to the network management message. According to the state provided by the network management message, the time during which the network management is in the RSS state is calculated and is utilized for determining the time of staying at the RSS this time. For a normal duration of RSS, once the traffic transmission is completed, the ECU exits the RSS and won't stay at the RSS. If the ECU stays at the RSS, it means that there is an abnormality in the ECU, and the abnormal ECU is the ECU that has been sending network management messages abnormally.

The traffic of each ECU, which is related to the CAN in the vehicle, has its maximum duration, whether the duration of the RSS exceeds the maximum traffic time of the corresponding ECU can be learned by parsing the notification message from the server. If the duration of RSS has exceeded the maximum traffic time of the ECU corresponding to this received message ID, it is considered that the traffic of this ECU is abnormal, and the abnormality protection process is continued.

If it is determined that the ECU is in an abnormal state, the audit node sends the restart instruction to the corresponding ECU. The audit node can send a UDS service 0x11 restart instruction. The audit node may also customize a UDS instruction abnormality instruction. The ECU that receives this instruction learns that the its own CAN is abnormal, and then acts on its own to restore the CAN and reset all CAN-related states.

Finally, the audit node broadcasts the abnormality restart message of this ECU to the TBOX through a CAN message, and the TBOX reports to the CSP server.

If the problem cannot be solved by a restart, it can be manually determined from the server side to determine the solution to the abnormal state. The instruction operation in other key-off states is similar to the above flow and is not described in detail in this embodiment.

To sum up, in this embodiment of the present disclosure, the abnormal ECU is controlled to restart in the key-off state, ensuring that the abnormal node will not be in an abnormal working state for a long time. When the vehicle is in the key-off state, the method in this embodiment can also prevent the battery drainage caused by the ECU abnormality, and improve the vehicle use experience of users.

Example Embodiment III

Figure 5:
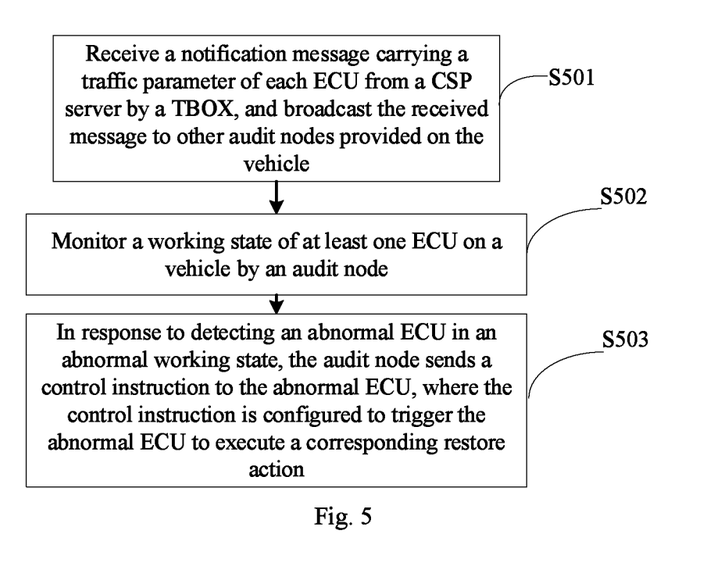
FIG. 5 is a flowchart of example embodiment III of the present disclosure.

A third embodiment of the present disclosure provides a method for managing an ECU on a vehicle, as shown in FIG. 5, including the following steps.

At S501, a notification message carrying a traffic parameter of each ECU from a CSP server is received by a TBOX and is broadcast to other audit nodes provided on the vehicle.

At S502, a working state of at least one ECU on a vehicle is monitored by an audit node.

At S503, in response to detecting an abnormal ECU in an abnormal working state, an audit node sends a control instruction to the abnormal ECU, where the control instruction is configured to trigger the abnormal ECU to execute a corresponding restore action.

The audit node may be an in-vehicle TBOX and a target ECU; or may also be only one of an in-vehicle TBOX or a target ECU; or a combination of a TBOX and target ECUs, such as the TBOX and three target ECUs in this embodiment. For the target ECUs, in this embodiment, an ECU having relatively stable working condition or low functional complexity may be selected as the audit node, according to the actual work performance or the function complexity of the ECU. Then the audit node ECU monitors the working state of at least one ECU on the vehicle.

After being powered on, the TBOX collects the notification message carrying the traffic parameter of each ECU from the CSP server, parses and saves the message and broadcasts the parsed message to other audit nodes of the CAN bus through the CAN. Therefore, all audit nodes know the traffic parameter of each ECU in the normal operation state. In this embodiment, the format of the traffic parameter recorded by the CSP server and of each ECU can be set according to the fact that the network management message ID of each ECU of the vehicle is unique, for example, the network management message ID of the ECU is utilized as a label of this record, and the network management message ID represents one specific ECU node. The network management message sent by the ECU to the audit node may include two critical states: a KL15 off (key-off) state and a KL15 on (key-on) state. The audit node can record the two critical states. The network management message may also include the traffic parameters of the corresponding ECU. Therefore, in this embodiment, the network management message sent from the ECU may further be parsed to obtain the traffic state parameter of the current ECU, thereby determining whether the state of the ECU is abnormal or not by comparing the traffic state parameter with the normal traffic state parameter corresponding to the ECU.

The monitoring means may be allocating a corresponding physical address for each ECU, and thus monitoring the working state of the ECU according to the corresponding physical address. A control instruction can be sent to an abnormal ECU according to the corresponding physical address. According to this embodiment, in response to detecting an abnormal ECU in an abnormal working state, a control instruction is sent to the abnormal ECU. In some implementation, the abnormal ECU may execute the corresponding restore action according to the control instruction, thereby improving the operation stability of the ECUs on the vehicle and preventing the vehicle battery drainage caused by the abnormality of the ECU, improving the user experience.

The control instruction may include at least one of: an ECU restart instruction for triggering the abnormal ECU to execute a restart; an ECU shutdown instruction for triggering the abnormal ECU to execute a shutdown; or an ECU firmware update instruction for triggering the abnormal ECU to execute a firmware update.

Figure 6:
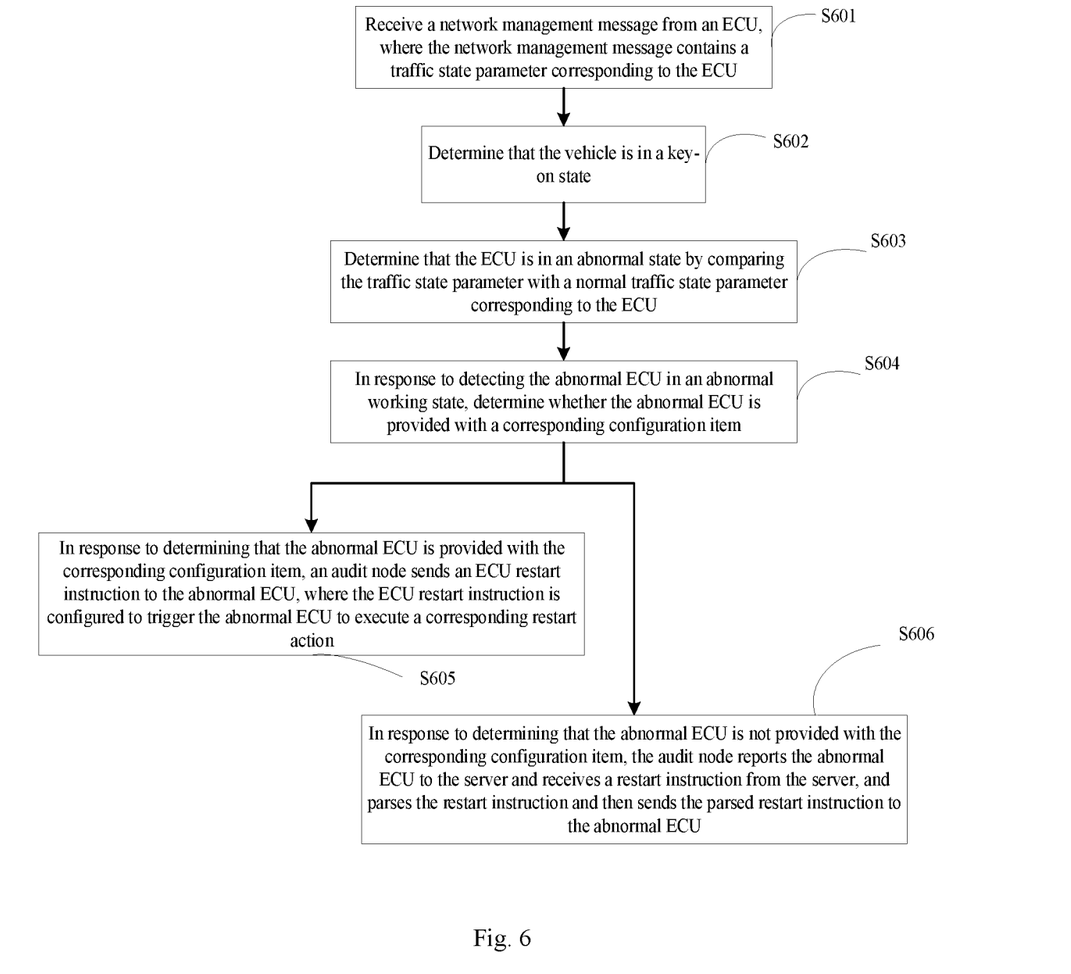
FIG. 6 is a flowchart in a key-on state according to example embodiment III of the present disclosure.

In this embodiment, the case where the ECU is controlled to restart in the key-on state is used as an example. As shown in FIG. 6, the method of this embodiment includes the following steps.

At S601, a network management message from an ECU is received, where the network management message contains a traffic state parameter corresponding to the ECU.

At S602, it is determined that the vehicle is in a key-on state.

At S603, it is determined that the ECU is in an abnormal state by comparing the traffic state parameter with a normal traffic state parameter corresponding to the ECU.

At S604, in response to detecting the abnormal ECU in an abnormal working state, it is determined whether the abnormal ECU is provided with a corresponding configuration item.

At S605, in response to determining that the abnormal ECU is provided with the corresponding configuration item, an audit node sends an ECU restart instruction to the abnormal ECU, where the ECU restart instruction is configured to trigger the abnormal ECU to execute a corresponding restart action.

At S606, in response to determining that the abnormal ECU is not provided with the corresponding configuration item, the audit node reports the abnormal ECU to the server and receives a restart instruction from the server, and parses the restart instruction and then sends the parsed restart instruction to the abnormal ECU.

This embodiment corresponds to the method for managing the ECU in a key-on and driving state. In the key-on state, the audit node uses the CAN bus to receive APP messages of other ECUs, where the APP messages carry the traffic states of the ECUs.

Then the state of KL15 is determined according to the messages. If KL15 is ON, the process goes on; otherwise, the process ends.

In this embodiment, determining the ECU abnormality in the key-on state may include two ways as follows.

In response to abnormal receiving of the network management message from the ECU, the ECU is determined to be in an abnormal working state.

In an optional implementation, if the ECU is in the state where it is unable to send the network management message, the ECU can be determined to be in an abnormal state directly according to the fact that the network management message sent by the ECU cannot be received properly. For example, in the key-on state, the normal network management message sent from the server is sent at regular intervals, with the time interval being t1, and after time t1, if the audit node fails to receive the network management message from the ECU, the ECU may be directly determined to be in an abnormal state.

The traffic state of the ECU in the message is compared against the traffic state of the corresponding ECU sent from the server to determine whether the traffic state in the current message is consistent with the recorded traffic state.

Alternatively, for example, in the KL15 on (key-on) state, the traffic state parameter in the key-on state is compared against the traffic state parameter during normal driving sent from the server, and if there is any inconsistency, the ECU is directly determined to be in an abnormal state. Here, the traffic state parameter during normal driving can be obtained from the server at power-on, or by reading the local storage.

In this embodiment, after the ECU abnormality is determined, an abnormal time can accumulate from the abnormality confirmation time. When the ECU is determined to be normal, the abnormal time can be reset. After the abnormal time accumulates, it is further determined whether the value of the accumulating abnormal time exceeds a preset maximum abnormal time. In response to the abnormal time exceeding the maximum abnormal time, it is determined whether the abnormal ECU is provided with a corresponding configuration item. In an implementation, after being powered on, the TBOX receives the notification message carrying the traffic parameter of each ECU from the server and parses the notification message to obtain whether each ECU is provided with a restart switch. In the case where the ECU is provided with the restart switch, it means that the ECU in the key-on state can restart or execute a restart action. In this embodiment, in the case where it is determined that the abnormal ECU is provided with the corresponding configuration item, the ECU restart instruction is directly sent to the abnormal ECU, thereby controlling the ECU to restore the state in the key-on state.

After determining that the abnormal ECU is not provided with the corresponding configuration item, the audit node reports the emergency event of the abnormal traffic state of the ECU to the TBOX, and then the TBOX reports the emergency event to the CSP server, and the CSP server determines whether to restart the unit. If the server side determines that the ECU needs to be restarted, the TBOX receives the restart instruction sent by the server, and parses the restart instruction and then sends the parsed restart instruction to the corresponding ECU.

To sum up, in this embodiment of the present disclosure, the abnormal ECU is controlled to restart in the key-on state, ensuring that the abnormal node does not work in an abnormal working state for a long time, ensuring the stable operation of the vehicle, effectively reducing the number of times the user visits the 4S store, and improving the vehicle use experience of users.

Example Embodiment IV

An embodiment of the present disclosure provides an ECU, including: a processor, a memory and a communication bus, where the communication bus is configured to implement connection and communication between the processor and the memory; and the processor is configured to execute one or more computer programs stored in the memory to perform the method for managing an ECU on a vehicle of the embodiments I, II and III.

An embodiment of the present disclosure provides a vehicle including any of the above ECUs.

An embodiment of the present disclosure provides a computer-readable storage medium storing one or more computer programs executable by one or more processors to perform the method for managing an ECU on a vehicle of any of the embodiments I, II and III.

Embodiments of the present disclosure provide a method for managing an ECU on a vehicle, an ECU and a computer-readable storage medium. By monitoring the state of ECUs of the vehicle, and sending a control instruction to the ECU in response to an abnormal ECU being detected, to cause the abnormal ECU to execute a corresponding restore action according to the control instruction, the battery drainage caused by the abnormal ECU after the vehicle is keyed off can be prevented.

According to the method for managing an ECU on a vehicle, the ECU, the vehicle and the computer-readable storage medium provided by the embodiments of the present disclosure, in response to detecting an abnormal ECU in an abnormal working state, a control instruction is sent to the abnormal ECU. In some implementation processes, the abnormal ECU may execute the corresponding restore action according to the control instruction, thereby improving the operation stability of the ECUs on the vehicle and preventing the vehicle battery drainage caused by the abnormality of the ECU, improving the user experience.

As can be seen, it should be understood by those having ordinary skill in the art that all or some of the operations in the methods disclosed above, functional modules/units in the systems and devices disclosed above may be implemented as software (which may be implemented by computer program code executable by a computing device), firmware, hardware, or appropriate combinations thereof. In a hardware embodiment, the division between functional modules/units mentioned in the above description does not necessarily correspond to the division of physical components; for example, a physical component may have multiple functions, or a function or step may be performed cooperatively by several physical components. Some or all of the physical components may be implemented as software executed by a processor, such as a central processing unit, a digital signal processor or a microprocessor, or as hardware, or as an integrated circuit, such as an application-specific integrated circuit.

Furthermore, it is well known to those having ordinary skill in the art that communication media typically contain computer-readable instructions, data structures, computer program modules or other data in a modulated data signal such as a carrier wave or other transmission mechanism, and may include any information delivery media. Therefore, the present disclosure is not limited to any particular combination of hardware and software.

The foregoing is a further detailed description of the embodiments of the present disclosure in conjunction with particular implementations, and specific implementations of the present disclosure should not be construed as being limited to the description. For those having ordinary skill in the art to which the present disclosure pertains, without departing from the concept of the present disclosure, simple deductions or substitutions can be made, which should be regarded as falling within the scope of the present disclosure.

What is claimed is:

1. A method for managing an electronic control unit (ECU) on a vehicle, comprising:
   receiving, by an in-vehicle telematics box, a notification message carrying a traffic parameter of each of the at least one ECU from an in-vehicle cloud server, and broadcasting the received notification message to at least one audit node configured on the vehicle;
   monitoring a working state of at least one ECU on a vehicle; and
   in response to detecting an abnormal ECU in an abnormal working state, sending a control instruction to the abnormal ECU, wherein the control instruction is configured to trigger the abnormal ECU to execute a corresponding restore action;
   wherein,
   when the vehicle is in a key-off state, sending a control instruction to the abnormal ECU comprises at least one of:
   directly sending an ECU restart instruction to the abnormal ECU;
   determining a fault code of the abnormal ECU, and in response to determining according to the fault code that the abnormal ECU is restorable by a restart, sending an ECU restart instruction to the abnormal ECU;
   directly sending an ECU shutdown instruction to the abnormal ECU;
   determining a fault code of the abnormal ECU, and in response to determining according to the fault code that the abnormal ECU is unrestorable by a restart, sending an ECU shutdown instruction to the abnormal ECU or sending an ECU firmware update instruction to the abnormal ECU;
   directly sending an ECU firmware update instruction to the abnormal ECU;
   sending an ECU restart instruction to the abnormal ECU according to a preset restart control rule, and in response to detecting that the abnormal ECU is still abnormal after a restart according to the ECU restart instruction, sending an ECU shutdown instruction or an ECU firmware update instruction to the abnormal ECU; or
   sending an ECU restart instruction to the abnormal ECU according to a preset restart control rule, sending an ECU firmware update instruction to the abnormal ECU in response to detecting that the abnormal ECU is still abnormal after a restart according to the ECU restart instruction, and sending an ECU shutdown instruction to the abnormal ECU in response to detecting that the abnormal ECU is still abnormal after a firmware update according to the ECU firmware update instruction;
   or
   when the vehicle is in a key-on state, sending a control instruction to the abnormal ECU comprises at least one of:

directly sending an ECU restart instruction to the abnormal ECU;
determining a fault code of the abnormal ECU, and in response to determining according to the fault code that the abnormal ECU is restorable by a restart, sending an ECU restart instruction to the abnormal ECU;
determining a fault code of the abnormal ECU, and in response to determining according to the fault code that the abnormal ECU is unrestorable by a restart, sending an ECU firmware update instruction to the abnormal ECU;
directly sending an ECU firmware update instruction to the abnormal ECU; or
sending an ECU restart instruction to the abnormal ECU according to a preset restart control rule, and sending an ECU firmware update instruction to the abnormal ECU in response to detecting that the abnormal ECU is still abnormal after a restart according to the ECU restart instruction; and
wherein the at least one audit node comprises at least one of an in-vehicle mobile communication terminal or a target ECU.

2. The method for managing an ECU on a vehicle of claim 1, wherein before sending the ECU restart instruction or the ECU firmware update instruction, the method further comprises: determining that the abnormal ECU is provided with a corresponding configuration item.

3. The method for managing an ECU on a vehicle of claim 2, wherein detecting an abnormal ECU in an abnormal working state comprises:
receiving a network management message from an ECU, wherein the network management message contains a traffic state parameter corresponding to the ECU; and
determining that the ECU is in an abnormal state by comparing the traffic state parameter with a normal traffic state parameter corresponding to the ECU.

4. The method for managing an ECU on a vehicle of claim 2, wherein monitoring a working state of at least one ECU on a vehicle comprises:
monitoring the working state of the at least one ECU by an audit node configured on the vehicle, wherein
the audit node comprises at least one of an in-vehicle mobile communication terminal or a target ECU.

5. The method for managing an ECU on a vehicle of claim 2, wherein in response to detecting an abnormal ECU in an abnormal working state, sending a control instruction to the abnormal ECU comprises:
in response to detecting an ECU of the at least one ECU in an abnormal working state, an audit node configured on the vehicle sends a control instruction to the abnormal ECU.

6. The method for managing an ECU on a vehicle of claim 1, wherein detecting an abnormal ECU in an abnormal working state comprises:
receiving a network management message from an ECU, wherein the network management message contains a traffic state parameter corresponding to the ECU; and
determining that the ECU is in an abnormal state by comparing the traffic state parameter with a normal traffic state parameter corresponding to the ECU.

7. The method for managing an ECU on a vehicle of claim 6, wherein determining that the ECU is in an abnormal state by comparing the traffic state parameter with a normal traffic state parameter corresponding to the ECU comprises at least one of:

determining that the ECU is in an abnormal state in response to the traffic state parameter being inconsistent with the normal traffic state parameter; or
determining that the ECU is in an abnormal state in response to ready sleep state (RSS) information extracted from the network management message indicating that a normal duration of RSS being exceeded.

8. The method for managing an ECU on a vehicle of claim 1, wherein monitoring a working state of at least one ECU on a vehicle comprises:
monitoring the working state of the at least one ECU by an audit node configured on the vehicle, wherein
the audit node comprises at least one of an in-vehicle mobile communication terminal or a target ECU.

9. The method for managing an ECU on a vehicle of claim 8, wherein a plurality of target ECUs are provided on the vehicle, in response to a proportion of the plurality of target ECUs being in an abnormal state and the proportion of the plurality of target ECUs exceeding a preset proportion threshold, sending the ECU restart instruction to the abnormal ECU comprises:
sending the ECU restart instruction to the proportion of the plurality of target ECUs according to a restart sequence.

10. The method for managing an ECU on a vehicle of claim 1, wherein a plurality of target ECUs are provided on the vehicle, in response to the plurality of target ECUs being in an abnormal state, sending the ECU restart instruction to the abnormal ECUs comprises:
sending the ECU restart instruction to the plurality of target ECUs at different time points such that the plurality of target ECUs restart at different time points.

11. The method for managing an ECU on a vehicle of claim 1, wherein detecting an abnormal ECU in an abnormal working state comprises:
receiving a network management message from an ECU, wherein the network management message contains a traffic state parameter corresponding to the ECU; and
determining that the ECU is in an abnormal state by comparing the traffic state parameter with a normal traffic state parameter corresponding to the ECU.

12. The method for managing an ECU on a vehicle of claim 1, wherein detecting an abnormal ECU in an abnormal working state comprises:
receiving a network management message from an ECU, wherein the network management message contains a traffic state parameter corresponding to the ECU; and
determining that the ECU is in an abnormal state by comparing the traffic state parameter with a normal traffic state parameter corresponding to the ECU.

13. The method for managing an ECU on a vehicle of claim 1, wherein monitoring a working state of at least one ECU on a vehicle comprises:
monitoring the working state of the at least one ECU by an audit node configured on the vehicle, wherein
the audit node comprises at least one of an in-vehicle mobile communication terminal or a target ECU.

14. An electronic control unit (ECU), comprising:
a processor;
a memory; and
a communication bus, wherein
the communication bus is configured to implement connection and communication between the processor and the memory; and
the processor is configured to execute at least one computer program stored in the memory to perform a method for managing the ECU, the method comprising:

receiving, by an in-vehicle telematics box, a notification message carrying a traffic parameter of each of the at least one ECU from an in-vehicle cloud server, and broadcasting the received notification message to at least one audit node configured on the vehicle;

monitoring a working state of at least one ECU on a vehicle; and in response to detecting an abnormal ECU in an abnormal working state, sending a control instruction to the abnormal ECU, wherein the control instruction is configured to trigger the abnormal ECU to execute a corresponding restore action;

wherein, when the vehicle is in a key-off state, sending a control instruction to the abnormal ECU comprises at least one of:

directly sending an ECU restart instruction to the abnormal ECU;

determining a fault code of the abnormal ECU, and in response to determining according to the fault code that the abnormal ECU is restorable by a restart, sending an ECU restart instruction to the abnormal ECU;

directly sending an ECU shutdown instruction to the abnormal ECU;

determining a fault code of the abnormal ECU, and in response to determining according to the fault code that the abnormal ECU is unrestorable by a restart, sending an ECU shutdown instruction to the abnormal ECU or sending an ECU firmware update instruction to the abnormal ECU;

directly sending an ECU firmware update instruction to the abnormal ECU;

sending an ECU restart instruction to the abnormal ECU according to a preset restart control rule, and in response to detecting that the abnormal ECU is still abnormal after a restart according to the ECU restart instruction, sending an ECU shutdown instruction or an ECU firmware update instruction to the abnormal ECU; or sending an ECU restart instruction to the abnormal ECU according to a preset restart control rule, sending an ECU firmware update instruction to the abnormal ECU in response to detecting that the abnormal ECU is still abnormal after a restart according to the ECU restart instruction, and sending an ECU shutdown instruction to the abnormal ECU in response to detecting that the abnormal ECU is still abnormal after a firmware update according to the ECU firmware update instruction;

or when the vehicle is in a key-on state, sending a control instruction to the abnormal ECU comprises at least one of:

directly sending an ECU restart instruction to the abnormal ECU;

determining a fault code of the abnormal ECU, and in response to determining according to the fault code that the abnormal ECU is restorable by a restart, sending an ECU restart instruction to the abnormal ECU;

determining a fault code of the abnormal ECU, and in response to determining according to the fault code that the abnormal ECU is unrestorable by a restart, sending an ECU firmware update instruction to the abnormal ECU;

directly sending an ECU firmware update instruction to the abnormal ECU; or sending an ECU restart instruction to the abnormal ECU according to a preset restart control rule, and sending an ECU firmware update instruction to the abnormal ECU in response to detecting that the abnormal ECU is still abnormal after a restart according to the ECU restart instruction; and wherein the at least one audit node comprises at least one of an in-vehicle mobile communication terminal or a target ECU.

15. A non-transitory computer-readable storage medium, which stores at least one computer program executable by at least one processor to perform a method for managing an electronic control unit (ECU) on a vehicle, the method comprising:

receiving, by an in-vehicle telematics box, a notification message carrying a traffic parameter of each of the at least one ECU from an in-vehicle cloud server, and broadcasting the received notification message to at least one audit node configured on the vehicle;

monitoring a working state of at least one ECU on a vehicle; and in response to detecting an abnormal ECU in an abnormal working state, sending a control instruction to the abnormal ECU, wherein the control instruction is configured to trigger the abnormal ECU to execute a corresponding restore action;

wherein, when the vehicle is in a key-off state, sending a control instruction to the abnormal ECU comprises at least one of:

directly sending an ECU restart instruction to the abnormal ECU;

determining a fault code of the abnormal ECU, and in response to determining according to the fault code that the abnormal ECU is restorable by a restart, sending an ECU restart instruction to the abnormal ECU;

directly sending an ECU shutdown instruction to the abnormal ECU;

determining a fault code of the abnormal ECU, and in response to determining according to the fault code that the abnormal ECU is unrestorable by a restart, sending an ECU shutdown instruction to the abnormal ECU or sending an ECU firmware update instruction to the abnormal ECU;

directly sending an ECU firmware update instruction to the abnormal ECU;

sending an ECU restart instruction to the abnormal ECU according to a preset restart control rule, and in response to detecting that the abnormal ECU is still abnormal after a restart according to the ECU restart instruction, sending an ECU shutdown instruction or an ECU firmware update instruction to the abnormal ECU; or sending an ECU restart instruction to the abnormal ECU according to a preset restart control rule, sending an ECU firmware update instruction to the abnormal ECU in response to detecting that the abnormal ECU is still abnormal after a restart according to the ECU restart instruction, and sending an ECU shutdown instruction to the abnormal ECU in response to detecting that the abnormal ECU is still abnormal after a firmware update according to the ECU firmware update instruction;

or
- when the vehicle is in a key-on state, sending a control instruction to the abnormal ECU comprises at least one of:
- directly sending an ECU restart instruction to the abnormal ECU;
- determining a fault code of the abnormal ECU, and in response to determining according to the fault code that the abnormal ECU is restorable by a restart, sending an ECU restart instruction to the abnormal ECU;
- determining a fault code of the abnormal ECU, and in response to determining according to the fault code that the abnormal ECU is unrestorable by a restart, sending an ECU firmware update instruction to the abnormal ECU;
- directly sending an ECU firmware update instruction to the abnormal ECU; or
- sending an ECU restart instruction to the abnormal ECU according to a preset restart control rule, and sending an ECU firmware update instruction to the abnormal ECU in response to detecting that the abnormal ECU is still abnormal after a restart according to the ECU restart instruction; and wherein the at least one audit node comprises at least one of an in-vehicle mobile communication terminal or a target ECU.

\* \* \* \* \*